(12) United States Patent
Dionne et al.

(10) Patent No.: US 11,092,122 B2
(45) Date of Patent: Aug. 17, 2021

(54) ENGINE ASSEMBLY WITH ENGINE AND COOLER COMPARTMENTS

(71) Applicant: PRATT & WHITNEY CANADA CORP., Longueuil (CA)

(72) Inventors: Luc Dionne, Candiac (CA); Bruno Villeneuve, Boucherville (CA); Andre Julien, Sainte-Julie (CA); Serge Dussault, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/717,350

(22) Filed: Dec. 17, 2019

(65) Prior Publication Data

US 2020/0141370 A1 May 7, 2020

Related U.S. Application Data

(63) Continuation of application No. 15/666,773, filed on Aug. 2, 2017, now Pat. No. 10,527,012.
(Continued)

(51) Int. Cl.
| | |
|---|---|
| *F02M 35/10* | (2006.01) |
| *F01P 3/20* | (2006.01) |
| *F01P 7/14* | (2006.01) |
| *F01P 11/12* | (2006.01) |
| *F01P 3/18* | (2006.01) |
| *F02B 37/00* | (2006.01) |

(Continued)

(52) U.S. Cl.
CPC ......... *F02M 35/10268* (2013.01); *F01P 3/18* (2013.01); *F01P 3/20* (2013.01); *F01P 7/14* (2013.01); *F01P 11/12* (2013.01); *F02M 35/10157* (2013.01); *F01P 2001/005* (2013.01); *F02B 33/38* (2013.01); *F02B 37/00* (2013.01); *F02M 35/10203* (2013.01)

(58) Field of Classification Search
CPC ......... B60K 11/06; B60K 11/00; B60K 11/08; B60R 16/04
See application file for complete search history.

(56) References Cited

U.S. PATENT DOCUMENTS

| | | |
|---|---|---|
| 4,059,080 A | 11/1977 | Rudent |
| 4,590,889 A | 5/1986 | Hiereth |

(Continued)

FOREIGN PATENT DOCUMENTS

| | | |
|---|---|---|
| DE | 102015008060 | 10/2015 |
| EP | 2602143 | 6/2013 |

OTHER PUBLICATIONS

Teos Powertrain Engineering, Jet A-1 aircraft engine, Wasco.teos-engineering/experience/jet-a1-aircraft-engine/, May 4, 2017.
(Continued)

*Primary Examiner* — Shafiq Mian
(74) *Attorney, Agent, or Firm* — Norton Rose Fulbright Canada LLP

(57) ABSTRACT

An engine assembly includes an engine compartment containing an internal combustion engine and a cooler compartment adjacent the engine compartment containing a heat exchanger. The engine and cooler compartments have an opening defined therebetween. A forced air system is operable to drive an airflow. A method for cooling the engine and its compartment is disclosed.

10 Claims, 5 Drawing Sheets

Related U.S. Application Data

(60) Provisional application No. 62/526,541, filed on Jun. 29, 2017.

(51) Int. Cl.
    *F02B 33/38* (2006.01)
    *F01P 1/00* (2006.01)

(56) References Cited

U.S. PATENT DOCUMENTS

| | | |
|---|---|---|
| 5,351,476 A | 10/1994 | Laborie et al. |
| 7,753,036 B2 | 7/2010 | Lents et al. |
| 7,775,044 B2 | 8/2010 | Julien et al. |
| 9,416,730 B2 | 8/2016 | Skilton |
| 9,435,261 B2 | 9/2016 | De Vita et al. |
| 2007/0240416 A1* | 10/2007 | Ullyott .................. F02C 7/18 60/624 |
| 2008/0006739 A1 | 1/2008 | Mochida et al. |
| 2009/0145998 A1* | 6/2009 | Salyer .................. B64D 27/10 244/17.23 |
| 2011/0284298 A1 | 11/2011 | Ajisaka |
| 2013/0240284 A1 | 9/2013 | Ajisaka |
| 2015/0275749 A1 | 10/2015 | Thomassin et al. |
| 2015/0275756 A1 | 10/2015 | Bolduc et al. |
| 2016/0236767 A1 | 8/2016 | Mores et al. |

OTHER PUBLICATIONS

European Search Report dated Aug. 21, 2018 in counterpart Application No. EP 18181024.3.

\* cited by examiner

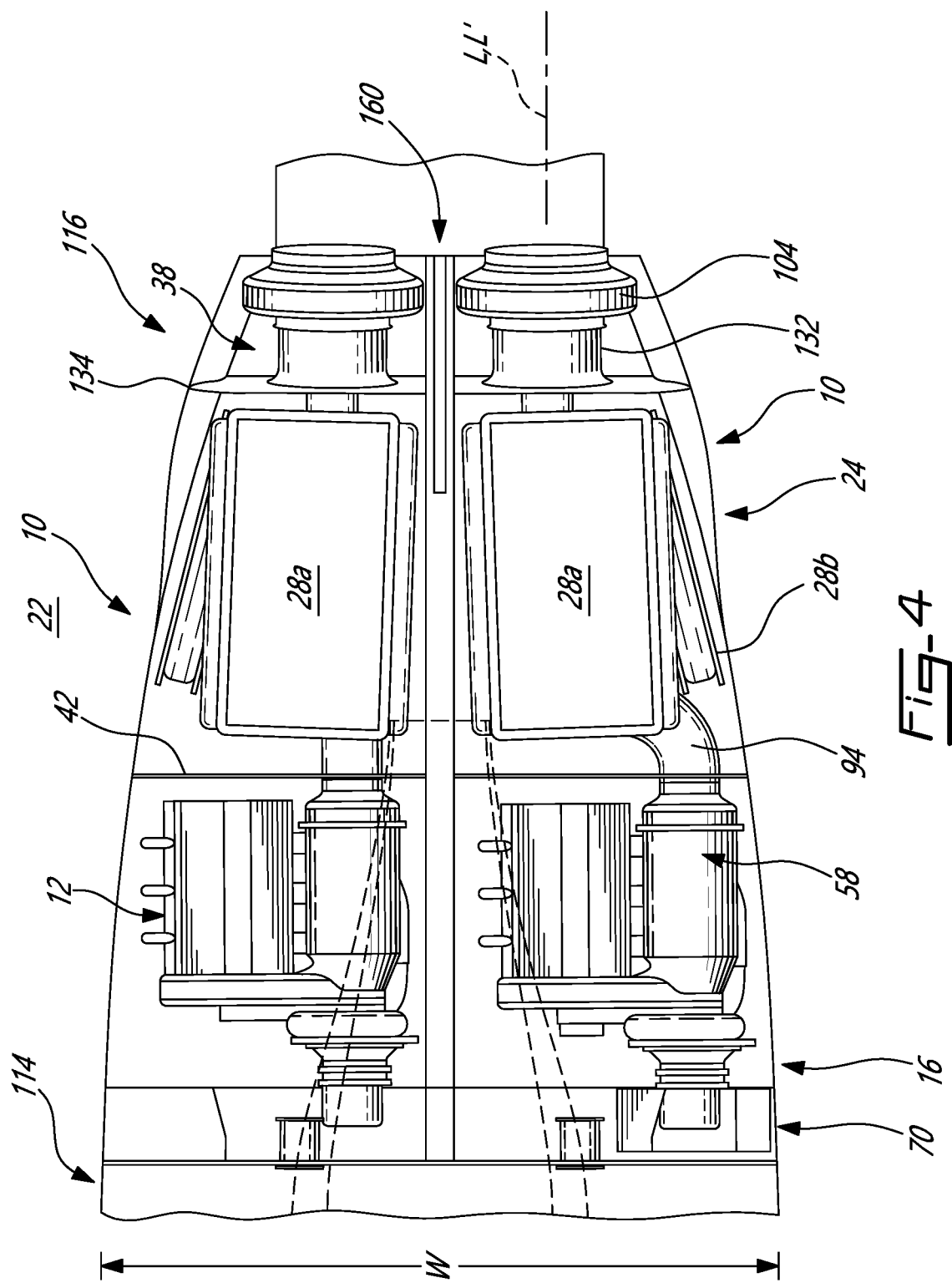

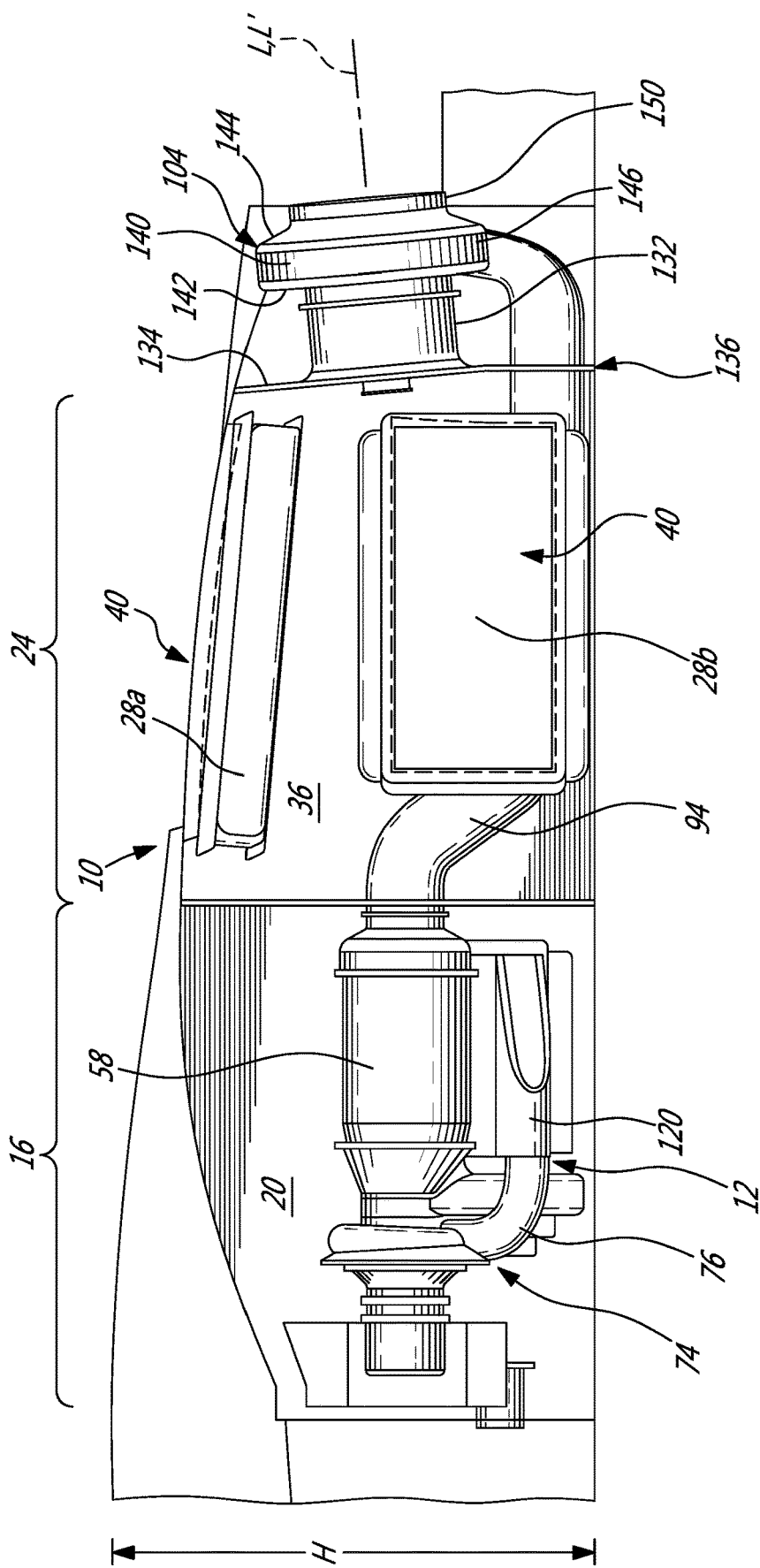

ENGINE ASSEMBLY WITH ENGINE AND COOLER COMPARTMENTS

CROSS-REFERENCE TO RELATED APPLICATIONS

This application is a continuation of U.S. application Ser. No. 15/666,773, filed Aug. 2, 2017, which claims priority from U.S. provisional application No. 62/526,541 filed Jun. 29, 2017, the entire contents of which are incorporated by reference herein.

TECHNICAL FIELD

The application relates generally to engine assemblies with internal combustion engines and, more particularly, to systems and methods used to cool such engines.

BACKGROUND OF THE ART

In some aircraft, for example helicopters, space may be limited for the installation of one or more engine(s). Liquid-cooled internal combustion engines typically require a cooler to cool the liquid coolant of the engine(s), as well as a blower or other forced air system to drive a cooling airflow through the cooler. In some instances, available space in the vehicle is limited, which may prevent the engine and cooler from being received in a common compartment. This may increase the cooling requirements for the engine, and thus require a further increase in the size of the cooler.

SUMMARY

In one aspect, there is provided an engine assembly, comprising: an engine compartment containing an internal combustion engine, the internal combustion engine having internal cooling circuitry for fluid cooling of the engine, the engine compartment having an air intake fluidly connecting an interior of the engine compartment to an environment of the engine assembly; a cooler compartment separate from and adjacent the engine compartment, the cooler compartment containing a heat exchanger fluidly connected to the cooling circuitry of the internal combustion engine, an interior of the cooler compartment fluidly connected to the environment via an inlet and an outlet; a metered opening fluidly connecting the engine compartment to the cooler compartment; and a forced air system fluidly between the inlet and the outlet and operable to drive an airflow from the inlet to the outlet through the heat exchanger, and from the intake to the outlet through the metered opening In another aspect, there is provided an engine assembly comprising: a compartment having separate engine and cooler sections fluidly connected with each other through an opening, the engine section having an air intake fluidly connecting an interior of the engine section to an environment of the engine assembly, an interior of the cooler section fluidly connected to the environment of the engine assembly via an inlet and an outlet; a compound engine received in the engine section and including a compressor in fluid communication with the environment of the engine assembly, an internal combustion engine having an inlet in fluid communication with an outlet of the compressor, and a turbine having an inlet in fluid communication with an exhaust of the internal combustion engine, the turbine compounded with the internal combustion engine, the compressor in driving engagement with at least one of the turbine and the internal combustion engine; a heat exchanger received in the cooler section, the heat exchanger fluidly connected to a fluid circuitry of the compound engine, the interior of the cooler section fluidly connected to the inlet of the cooler section via the heat exchanger; and a forced air system operable to drive an airflow, the forced air system in simultaneous fluid communication with a main flow path and a secondary flow path, the main flow path extending from the inlet of the cooler section to the outlet of the cooler section via the heat exchanger and the interior of the cooler section, the secondary flow path extending from the air intake of the engine section to the outlet of the cooler section via the interior of the engine section, the opening and the interior of the cooler section.

In another aspect, there is provided a method for cooling an internal combustion engine received in an engine compartment separated from a cooler compartment, the method comprising: expelling air from the cooler compartment to an environment with a forced air system to simultaneously create main and secondary airflows, wherein: creating the main airflow includes drawing outside air in the cooler compartment from the environment separately from the engine compartment; and creating the secondary airflow includes drawing additional air in the cooler compartment from the engine compartment through an opening fluidly connecting the cooler and engine compartments.

In a further aspect, there is provided an engine assembly within an aircraft vehicle, the vehicle having a longitudinal axis defined generally from a front end to a rear end, the engine assembly comprising: an engine compartment and a cooler compartment serially disposed in a direction of the longitudinal axis of the vehicle, the engine and cooler compartments separated from one another; an internal combustion engine disposed within the engine compartment; a heat exchanger disposed within the cooler compartment; a forced air system in the cooler compartment operable to drive an airflow through the heat exchanger.

DESCRIPTION OF THE DRAWINGS

Reference is now made to the accompanying figures in which:

FIG. 4 is a schematic partially transparent top view of the implementation of FIG. 3; and FIG. 5 is a schematic partially transparent side view of the implementation of FIG. 3.

DETAILED DESCRIPTION

Figure 1:
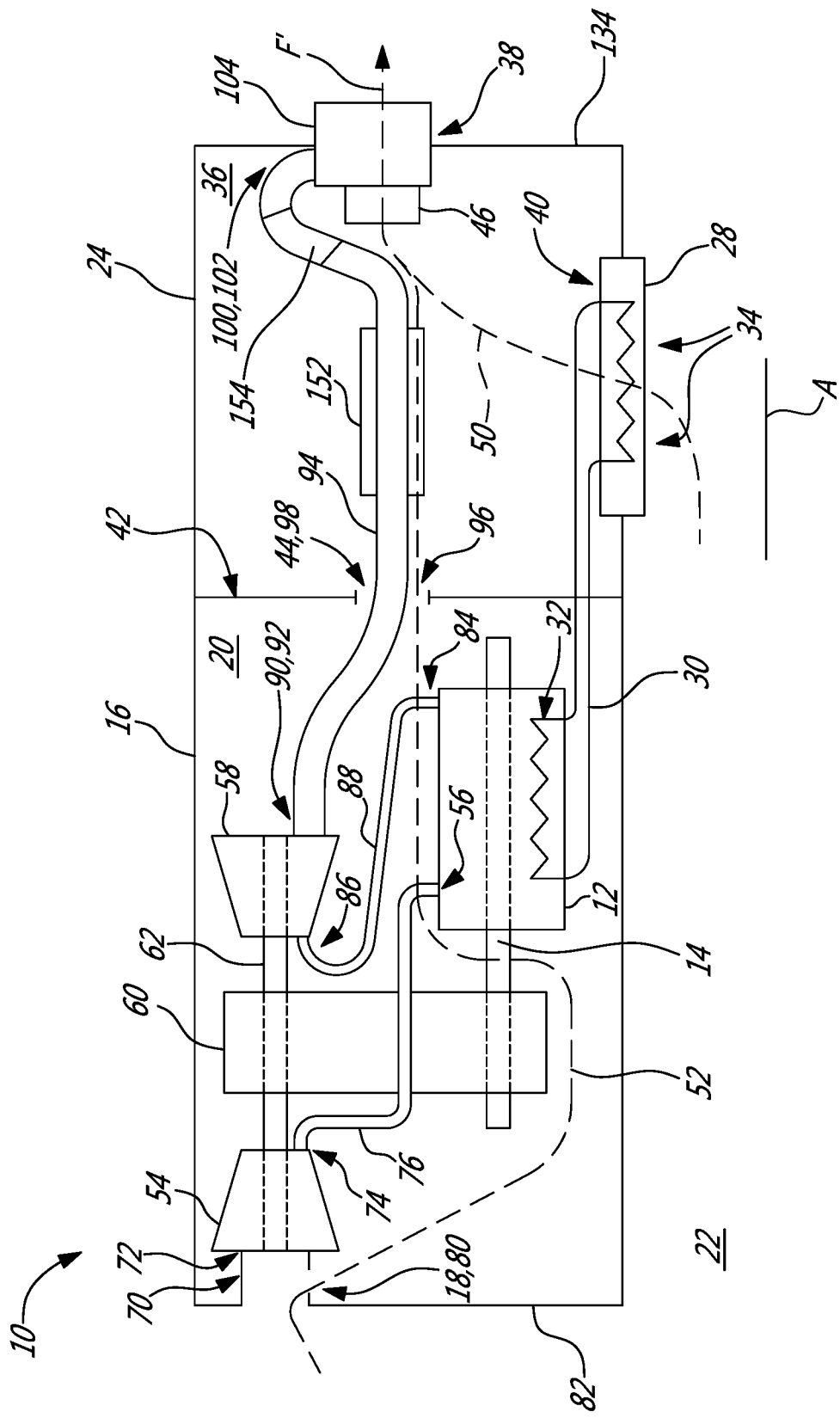
FIG. 1 is a schematic view of an engine assembly in accordance with a particular embodiment.

Referring to FIG. 1, an engine assembly 10 is generally shown and includes an internal combustion engine 12. In a particular embodiment, the internal combustion engine 12 comprises one or more rotary units each configured for example as a Wankel engine, or one or more reciprocating pistons. The internal combustion engine 12 drives a shaft 14 that is used for driving a rotatable load (not shown). It is understood that the engine assembly 10 may alternately be configured to drive any other appropriate type of load, including, but not limited to, one or more generator(s), propeller(s), accessory(ies), rotor mast(s), compressor(s), or any other appropriate type of load or combination thereof. In a particular embodiment, the internal combustion engine 12 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume.

In a particular embodiment, the engine assembly 10 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 10 may be used as a prime mover engine, such as on an aircraft or other vehicle, or in any other suitable application.

The engine assembly 10 comprises an engine compartment 16 containing the internal combustion engine 12. The engine compartment 16 has an air intake 18 fluidly connecting an interior 20 of the engine compartment 16 to an environment 22 of the engine assembly 10. The engine assembly 10 further has a cooler compartment 24 adjacent the engine compartment 16. In the illustrated embodiment, the engine compartment 16 and the cooler compartment 24 are serially disposed in a direction A parallel to the shaft 14 of the internal combustion engine 12.

In the embodiment shown, the engine assembly 10 further includes a compressor 54 for compressing the air before it is fed to an air inlet 56 of the internal combustion engine 12, and a turbine section 58 receiving the exhaust gases from the internal combustion engine 12. It is understood that variations are possible, and that, for example, the compressor 54 and/or turbine section 58 may be omitted.

In the illustrated embodiment, the internal combustion engine 12, the compressor 54, and the turbine section 58 are in driving engagement with a gearbox 60. The gear box 60 is configured to allow the turbine section 58 to compound power with the engine shaft 14 and to allow the turbine section 58 and/or the internal combustion engine 12 to drive the compressor 54.

In the illustrated embodiment, the compressor 54 and the turbine section 58 are in a driving engagement with the gearbox 60. In the illustrated embodiment, the compressor and turbine rotors are engaged to a same turbine shaft 62 which is drivingly engaged to the engine shaft 14 through the gearbox 60; the turbine shaft 62 and the engine shaft 14 are parallel and radially offset from one another. Alternate configurations are possible, including, but not limited to, the rotor(s) of the compressor 54 being engaged to a shaft separate from the turbine shaft 62 (whether coaxial with the turbine shaft 62, with the engine shaft 14, or offset from both) and in driving engagement with the turbine shaft 62 and/or the engine shaft 14, for example through the gearbox; and/or two or more of the shafts 62, 16 extending at an angle (perpendicularly or otherwise) to each other.

In the depicted embodiment, the engine assembly 10 further comprises an intake plenum 70 fluidly connected to an inlet 72 of the compressor 54 and to the environment 22, while an outlet 74 of the compressor 54 is in fluid communication with the air inlet 56 of the internal combustion engine 12, for example through a conduit 76.

The air intake 18 of the engine compartment is defined by an aperture 80 through the intake plenum 70. The aperture 80 fluidly connects the environment 22 with the engine compartment 16 via the intake plenum 70. In a particular embodiment, the air intake 18 of the engine compartment 16 is defined through a peripheral wall 82 of the engine compartment 16. Other locations of the air intake 18 of the engine compartment 16 are contemplated.

The internal combustion engine 12 provides an exhaust flow of high pressure hot gas exiting at high peak velocity, in the form of exhaust pulses. In the illustrated embodiment, an exhaust 84 of the internal combustion engine 12 (corresponding to or communicating with an exhaust port of a respective rotary engines/reciprocating pistons of the internal combustion engine 12) is in fluid communication with an inlet 86 of the turbine section 58 via a conduit 88. Accordingly, the exhaust flow from the internal combustion engine 12 is supplied to the turbine section 58. The turbine section 58 may comprise a single turbine, or two or more turbine stages in serial fluid communication; the two or more turbine stages may have different reaction ratios from one another. Other configurations are contemplated.

In the illustrated embodiment, an outlet 90 of the turbine section 58 is fluidly connected to an inlet 92 of an exhaust duct 94 for expelling combustion gases generated by the internal combustion engine 12 to the environment 22. In a particular embodiment, an insulation layer 152 is disposed around the exhaust duct 94. In a particular embodiment, the exhaust duct 94 includes a muffler 154 for decreasing noise generated by the engine and for treating the exhaust gases if required.

Still referring to FIG. 1, the cooler compartment 24 contains at least one heat exchanger 28. The heat exchanger 28 has one or more first conduit(s) 30 (one in the embodiment shown) fluidly connected to a fluid circuitry 32 of the engine assembly 10. In the embodiment shown, the fluid circuitry 32 is a cooling circuitry of the internal combustion engine 12 (e.g., coolant passages defined through the housing of the internal combustion engine 12) and one or more second conduit(s) 34 (a plurality in the embodiment shown) in heat exchange relationship with the first conduit 30; alternately, the fluid circuitry may include passages circulating coolant and/or lubricant to any suitable component of the engine assembly 10. An interior 36 of the cooler compartment 24 is fluidly connected to the environment 22 via the second conduits 34 of the heat exchanger 28 and via an outlet 38 spaced apart from the heat exchanger 28. The second conduits 34 of the heat exchanger 28 extend through, and define, an inlet 40 of the cooler compartment 24.

The engine assembly 10 further includes a wall 42, which may be a firewall, and which separates the engine compartment 16 from the cooler compartment 24. Stated otherwise, in the embodiment shown, the engine and cooler compartments 16 and 24 share a common wall 42. Alternately, one or more additional wall(s) could be provided between the engine compartment 16 and the cooler compartment 24.

The engine compartment 16 and the cooler compartment 24 are thus disposed on opposite sides of the wall 42. In the embodiment shown, the wall 42 is perpendicular to the axis A. The wall 42 has a metered opening 44 defined through the wall 42. The metered opening 44 fluidly connects the engine compartment 16 to the cooler compartment 24. Any other suitable feature to allow fluid communication between the engine compartment 16 and the cooler compartment 24 may be used.

The engine assembly 10 has a forced air system 46 adjacent the cooler compartment outlet 38 and operable to drive an airflow F'. The forced air system 46 is in simultaneous fluid communication with a main flow path 50 and a secondary flow path 52. The main flow path 50 extends through the second conduit 34 of the heat exchanger 28 to the outlet 38 of the cooler compartment 24 via the interior 36 of the cooler compartment 24. The secondary flow path 52 extends from the air intake 18 of the engine compartment 16 to the outlet 38 of the cooler compartment 24 via the interior 20 of the engine compartment 16, the metered opening 44 in the wall 42 and the interior 36 of the cooler compartment 24. The flow paths 50, 52 converge in the forced air system 46. The source of air of both flow paths 50, 52 is the environment 22 of the engine assembly 10.

The forced air system 46 is configured to draw air out of the cooler compartment 24 toward the environment thereof 22. The forced air system 46, by drawing air out of the cooler compartment 24, draws air from the environment 22 in the cooler compartment 24 through the second conduit 34 of the heat exchanger 28 and draws air from the environment 22 in the engine compartment 16 through the air intake 18. The air that is drawn in the engine compartment 16 from the environment 22 passes from the engine compartment 16 to the cooler compartment 24 through the wall 42 via the metered opening 44. To draw air in the cooler compartment 24, the forced air system 46 creates a pressure drop in the cooler compartment 24 such that an air pressure in the cooler compartment 24 is less than an air pressure of the engine compartment 16 and of the environment 22. Air is therefore drawn in the cooler compartment 24 to compensate for this pressure drop.

In the illustrated embodiment, the exhaust duct 94 passes through an aperture 96 extending through the wall 42 separating the engine compartment 16 from the cooler compartment 24. In the illustrated embodiment, the metered opening 44 corresponds to a gap 98, which may be an annular gap, between the exhaust duct 94 and a peripheral surface of the aperture 96. The gap 98 is created by the difference between the diameter of the aperture 44 and the outer diameter of the exhaust duct 94. Alternately, the metered opening 44 may include one or more aperture(s) in the wall 42 spaced apart from the aperture 96 that receives the exhaust duct 94, or may be defined by one or more aperture(s) through which another structure extends, or which are completely free; for example, the exhaust duct 94 may extend elsewhere than through the wall 42. In the illustrated embodiment, the aperture 96 is configured to be able to provide a flow in a range of from 2% to 10% of the gas turbine engine core flow, for example, 5% of the gas turbine engine core flow.

In the depicted embodiment, the exhaust duct 94 has an outlet 100 fluidly connected to an inlet 102 of an exhaust plenum 104. The exhaust plenum 104 is configured for distributing the exhaust gases around the airflow F' generated by the forced air system 46, for mixing the exhaust gases with this airflow F'. An example of this configuration is described in more detail herein below.

Figure 2:
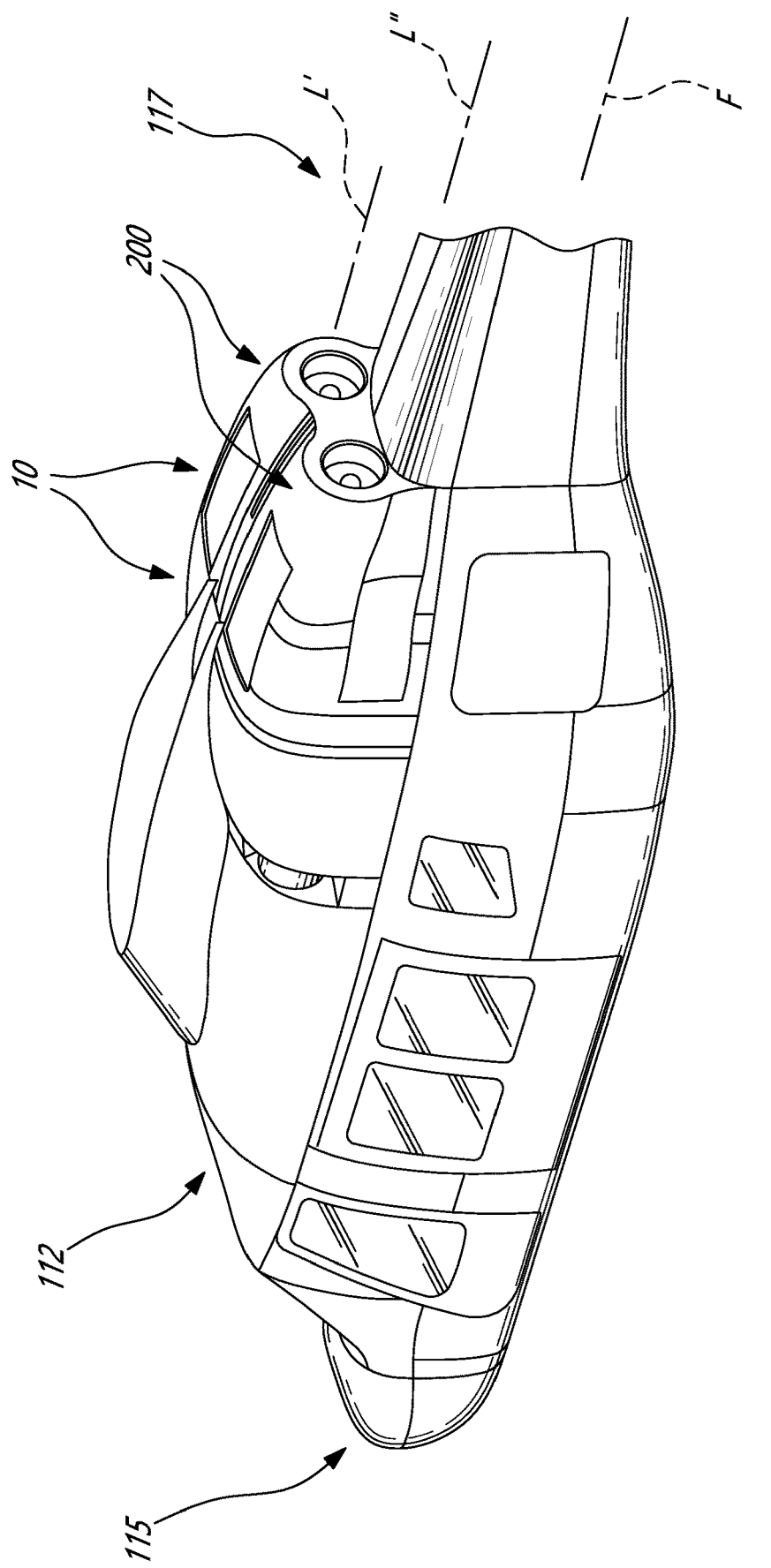
FIG. 2 is a schematic view of a vehicle containing two engine assemblies such as shown in FIG. 1, in accordance with a particular embodiment.

Now referring to FIG. 2, a helicopter 112 comprises two side-by-side engine assemblies 10 separated by a wall 160 (FIG. 4). Only one of the engine assemblies 10 of the helicopter 112 is described herein below; the other assembly 10 is identical or a mirror image of the described assembly, and accordingly will not be described separately herein. The helicopter 112 has a longitudinal axis F (e.g., roll axis) extending from front end 115 to a rear end 117 of the helicopter 112, and the two engine assemblies 10 are offset along a direction perpendicular to the axis F. The two engine assemblies 10 may be coupled to a transmission (not shown) of the helicopter 112 to drive a common load. In a particular embodiment, a power of the twin engine assemblies 10 is from 500 to 2000 horse power. A vehicle may comprise more than two engine assemblies 10.

Figure 3:
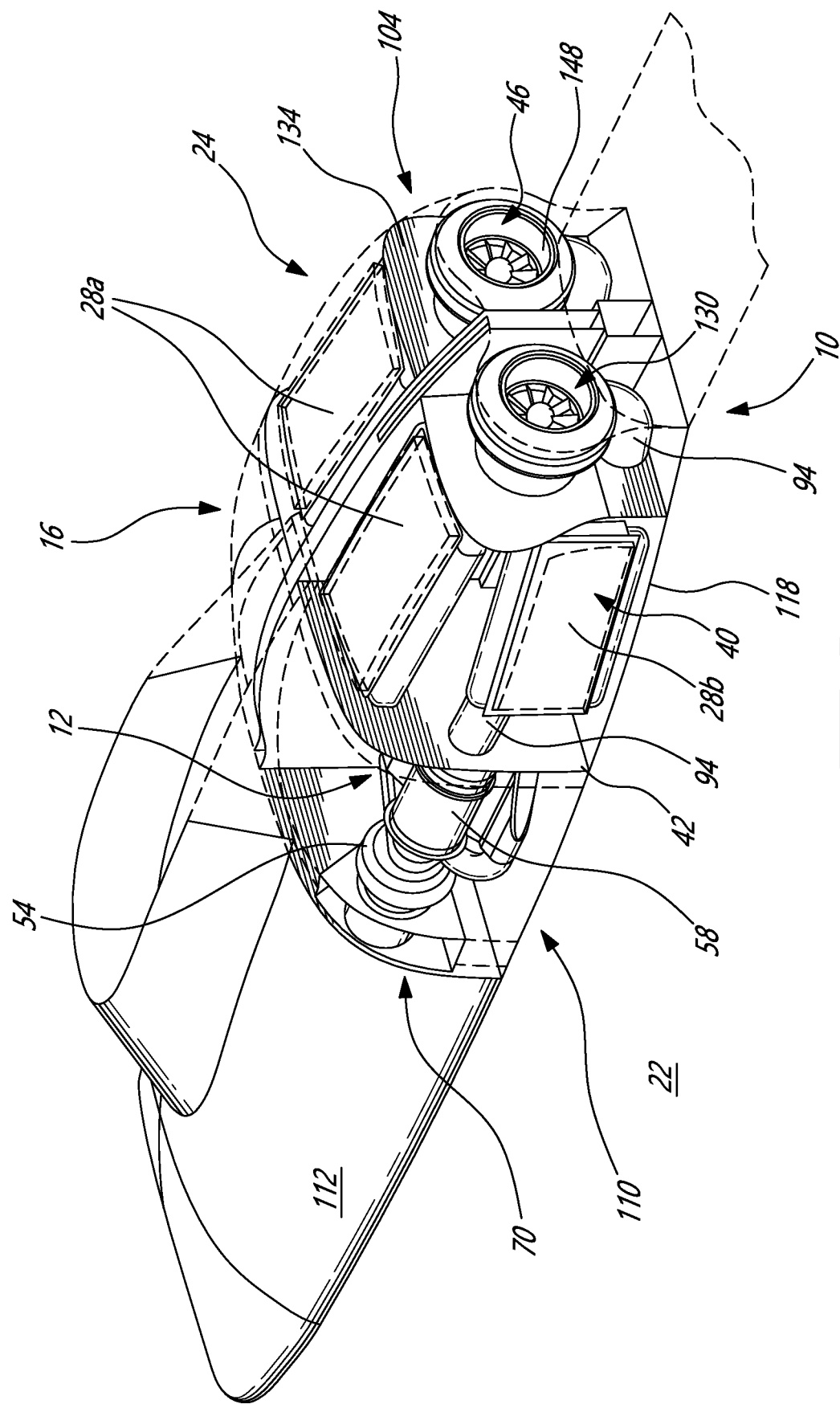
FIG. 3 is a schematic tridimensional view of an implementation of the engine assembly of FIG. 1 in the vehicle of FIG. 2, in accordance with a particular embodiment.

FIGS. 3-5 illustrate an exemplary configuration for the engine assembly 10 of FIGS. 1-2; other configurations are contemplated. In the embodiment shown, the engine and cooler compartments 16 and 24 are defined in an engine bay 110 of a vehicle 112. Hence, the engine bay 110 has an engine section 16 and a cooler section 24 separated from the engine section 16 by the wall 42. In a particular embodiment, the engine and cooler compartments, or sections, 16 and 24 are defined in a nacelle, and serially disposed in a direction of the longitudinal axis F. The wall 42 extends transversely, for example perpendicularly, to the longitudinal axis F. In the depicted embodiment, the engine and cooler compartments 16, 24 are streamlined and a width W (FIG. 4) of the combined engine and cooler compartments 16, 24 defined perpendicularly to the vehicle longitudinal axis F (FIG. 2) decreases from an upstream end 114 to a downstream end 116 of the engine assembly 10. A height H (FIG. 5) varies from the upstream end 114 to a downstream end 116 so as to define an aerodynamic profile.

In the embodiment shown, the cooler compartment 24 include peripheral walls 118 having apertures defining the cooler compartment inlet 40. In the illustrated embodiment, then engine assembly 10 has two heat exchangers 28a and 28b: a liquid cooler 28a and an oil cooler 28b. Each of the two heat exchangers 28a and 28b is connected to a respective fluid circuitry. The fluid circuitry of the oil cooler 28b is connected to an oil distribution system for cooling the oil of the engine assembly 10, which may include for example oil in the gear box 60, the compressor 54, the turbine 58, and/or the engine 12. The liquid cooler 28a is configured for cooling a liquid coolant of the internal combustion engine 12. In the illustrated embodiment, the heat exchangers 28a, 28b are disposed on top and side walls of the cooler compartment 24. The heat exchangers 28a, 28b cover the apertures defining the cooler compartment inlet 40 such that at least a portion of a wall or an entirety of a wall of the cooler compartment 24 is defined by the heat exchangers 28a, 28b. For example, the cooler compartment 24 is defined by the walls 118 extending from and connected around a perimeter of the heat exchangers 28a, 28b, with the inlet side of the heat exchangers 28a, 28b being directly exposed to the environment 22, and the opposed outlet side of the heat exchangers 28a, 28b being directly exposed to the interior 36 of the cooler compartment 24. The heat exchangers 28a, 28b are thus partly inside the cooler compartment 24 and partly exposed to the environment 22.

In the depicted embodiment and as can be best shown in FIG. 5, the conduit 76 interconnecting the compressor outlet 74 to the internal combustion engine 12 engine assembly 10 defines an air manifold 120 adjacent the internal combustion engine 12, for example for distributing the compressor air to the rotor units. Other configurations are also possible.

In the embodiment shown, the forced air system 46 includes a fan, or blower, 130 disposed adjacent the cooler compartment outlet 38. As can be best seen in FIG. 5, the fan 130 is disposed within an outlet duct 132. In the depicted embodiment, the fan 130 is driven by an electrical motor or a hydraulic motor. Other suitable motors may be used. In a particular embodiment, the fan 130 is driven by a hydraulic or a pneumatic transmission. Alternately, the fan 130 may be driven by the internal combustion engine 12 and/or the turbine section 58. It is understood that any other suitable type of forced air system, including, but not limited to ejector(s), pump(s), etc., may alternately be used.

In the illustrated embodiment, the outlet duct 132 is fluidly connected with the cooler compartment interior 36 via the outlet 38 of the cooler compartment 24. The outlet duct 132 is affixed to one of the peripheral walls 118 of the cooler compartment 24. In the embodiment shown, the outlet duct 132 is affixed to a rear wall 134 (or rear firewall) of the cooler compartment 24 and extends away from the cooler compartment 24. The outlet duct 132 fluidly connects the interior 36 of the cooler compartment 24 to the environment 22 via the cooler compartment outlet 38.

It can be seen that the engine and cooler compartments 16 and 24 are serially disposed in a direction of the longitudinal axis L of the outlet duct 132. In the illustrated embodiment, the exhaust duct 94 extends through an aperture 136 in the rear wall 134 of the cooler compartment 24 before being connected with the exhaust plenum 104.

Still referring to FIG. 5, in the embodiment shown the exhaust plenum 104 is annular and disposed around the duct 132. The exhaust plenum 104 has a circumferential outer wall 140 surrounding the outlet duct 132, an annular fore wall 142 and an annular aft wall 144. The annular fore and aft walls 142 and 144 are offset from one another along a longitudinal axis L of the outlet duct 132 and extend radially outwardly from the outlet duct 132. An inlet 146 of the exhaust plenum 104 is defined through the circumferential outer wall 140, and is connected to the exhaust duct 94 so as to receive the exhaust gases from the turbine section 58. An outlet of the exhaust plenum 104 is defined through the wall portion 148 (FIG. 3) of the outlet duct 132 which extends within the exhaust plenum 104, between the walls 142, 144. Therefore, the exhaust plenum 104 is configured to output the flow of exhaust gases in a radially inward direction relative to the longitudinal axis L of the outlet duct 132. The exhaust plenum 104 radially discharges the flow of combustion gases in the outlet duct 132 at a location downstream from the fan 130, so as to avoid exposing the fan 130 to the exhaust gases. The exhaust gases from the engine 12 are thus mixed with the airflow F' (FIG. 1) of the fan 130 within the duct 132 downstream of the fan 130 before being expelled in the environment 22.

In the embodiment shown, an aft portion 150 (FIG. 5) of the outlet duct 132 extends downstream of the annular aft wall 144. The flow of exhaust gases and the flow generated by the forced air system 46 are expelled in the environment 22 through the aft portion 150.

In the depicted embodiment, the longitudinal axis L of the outlet duct 132 is substantially parallel to the longitudinal axis F of the helicopter 112 (FIG. 2). Hence, the airflow of the forced air system 46 and the exhaust gases create a thrust that may overcome a portion of the drag of the vehicle 112. Moreover, a temperature of the gas expelled in the environment is reduced by mixing the exhaust gases from the internal combustion engine 12 with the airflow F' generated by the forced air system 46. In a particular embodiment, the temperature of the flow exiting the aft portion 150 of the outlet duct 132 is about 350° F. Other values are also possible.

Referring back to FIG. 2, each of the engine assemblies 10 of the helicopter 112 has an outlet 200, defined by the respective aft portion 150 of the outlet duct 132 (FIG. 5). In the illustrated embodiment, the outlets 200 are side-by-side, i.e. spaced apart along a direction perpendicular to the longitudinal axis F of the helicopter. The exit flow axes L' and L" of the engine assemblies 10 are parallel to one another, and parallel or substantially parallel to the longitudinal axis F of the helicopter 112.

Referring to FIGS. 1-5, in use and in a particular embodiment, in order to cool the internal combustion engine 12 received in the engine compartment 16 that is separated from the cooler compartment 24 by the common wall 42, air is expelled from the cooler compartment 24 toward the environment 22 with the forced air system 46 to simultaneously create the main and secondary airflows 50 and 52. In the illustrated embodiment, the main airflow 50 is created by drawing outside air in the cooler compartment 24 from the environment 22 of the cooler compartment 24. In so doing, the outside air is heated before it is received in the cooler compartment 24 by cooling a fluid of the internal combustion engine 12 or of the engine assembly 10. For example, the fluid may be oil of the internal combustion engine 12 and/or of the engine assembly 10 as a whole, and/or a liquid coolant for the internal combustion engine 12. The secondary air flow 52 is created by drawing air in the cooler compartment 24 from the engine compartment 16 through the metered opening 44 in the common wall 42.

In the illustrated embodiment, the metered opening 44 is the gap 98 between the peripheral surface of the aperture 96 of the common wall 42 and the exhaust duct 94 that passes through the aperture 96. The engine compartment is cooled by passing air from the engine compartment 16 to the cooler compartment 24 through the gap 44 around the exhaust duct 94.

In a particular embodiment, expelling air from the cooler compartment includes mixing the expelled air with the exhaust from the internal combustion engine 12, and/or generating thrust with the expelled air.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An engine assembly within an aircraft vehicle, the aircraft vehicle having a longitudinal axis defined from a front end to a rear end, the engine assembly comprising:
 an engine compartment and a cooler compartment serially disposed in a direction of the longitudinal axis of the vehicle, the engine and cooler compartments separated from one another;
 an internal combustion engine disposed within the engine compartment;
 a heat exchanger disposed within the cooler compartment;
 a forced air system in the cooler compartment operable to drive an airflow through the heat exchanger and;
 an exhaust duct fluidly connecting an exhaust of the internal combustion engine with an environment of the engine assembly, the exhaust duct extending through the cooler compartment.

2. The engine assembly as defined in claim 1, wherein the engine and cooler compartments are separated from one another by a firewall.

3. The engine assembly as defined in claim 2, wherein the firewall extends transversely to the longitudinal axis.

4. The engine assembly as defined in claim 1, wherein the heat exchanger is adjacent an inlet of the cooler compartment.

5. The engine assembly as defined in claim 1, wherein the heat exchanger is fluidly connected to a cooling circuitry of an internal combustion engine of the engine assembly.

6. The engine assembly as defined in claim 1, wherein the forced air system is operable to drive an airflow along a flow path extending from an inlet of the cooler compartment to an outlet of the cooler compartment through the heat exchanger and an interior of the cooler compartment, the heat exchanger providing heat exchange relationship between a fluid of the internal combustion engine of the engine assembly and the airflow from the forced air system.

7. The engine assembly as defined in claim 1, wherein the forced air system includes an outlet duct defining the communication between an outlet of the cooler compartment and the environment of the engine assembly, the engine compartment and the cooler compartment being serially disposed in a direction of a longitudinal axis of the outlet duct.

8. The engine assembly as defined in claim 1, wherein the internal combustion engine and the cooler compartment are serially disposed in a direction parallel to a shaft of the internal combustion engine.

9. The engine assembly as defined in claim 1, wherein a width of the engine assembly decreases along the longitudinal axis toward the rear end of the aircraft vehicle.

10. An aircraft vehicle including two engine assemblies each corresponding to the engine assembly as defined in claim 1, wherein the two engine assemblies are laterally offset from one another.

\* \* \* \* \*